(12) United States Patent
Belmonte et al.

(10) Patent No.: US 8,985,952 B2
(45) Date of Patent: Mar. 24, 2015

(54) TURBINE ENGINE FAN COMPRISING A BALANCING SYSTEM WITH BLIND HOLES FOR ACCOMMODATING MASSES

(75) Inventors: Olivier Belmonte, Perthes en Gatinais (FR); Lionel Rene Henri Weller, Champcueil (FR)

(73) Assignee: SNECMA, Paris (FR)

( * ) Notice: Subject to any disclaimer, the term of this patent is extended or adjusted under 35 U.S.C. 154(b) by 870 days.

(21) Appl. No.: 13/131,500

(22) PCT Filed: Dec. 9, 2009

(86) PCT No.: PCT/EP2009/066734
§ 371 (c)(1),
(2), (4) Date: May 26, 2011

(87) PCT Pub. No.: WO2010/066791
PCT Pub. Date: Jun. 17, 2010

(65) Prior Publication Data
US 2011/0223008 A1    Sep. 15, 2011

(30) Foreign Application Priority Data
Dec. 10, 2008    (FR) ..................................... 08 58451

(51) Int. Cl.
| | |
|---|---|
| *F01D 5/02* | (2006.01) |
| *F04D 29/00* | (2006.01) |
| *B64C 11/00* | (2006.01) |
| *F02C 7/04* | (2006.01) |
| *F04D 29/66* | (2006.01) |

(52) U.S. Cl.
CPC . *F02C 7/04* (2013.01); *F01D 5/027* (2013.01); *F04D 29/662* (2013.01); *Y02T 50/671* (2013.01); *Y02T 50/673* (2013.01); *F05D 2200/00* (2013.01)
USPC ....................................... 416/144; 416/193 R

(58) Field of Classification Search
CPC ......... F01D 5/027; F01D 5/02; F04D 29/662; F16F 15/32; F16F 15/00; F16F 2230/0011; B64C 11/008; B64C 11/02; B64C 11/14
USPC .......... 415/119; 416/144, 145, 193 R, 193 A, 416/500
See application file for complete search history.

(56) References Cited

U.S. PATENT DOCUMENTS

| | | | |
|---|---|---|---|
| 1,805,149 A | | 5/1931 | Nelson |
| 3,446,069 A | * | 5/1969 | Zink .......................... 73/170.17 |
| 8,215,910 B2 | | 7/2012 | Belmonte et al. |
| 2009/0087313 A1 | | 4/2009 | Belmonte et al. |

FOREIGN PATENT DOCUMENTS

| | | |
|---|---|---|
| FR | 921 720 | 5/1947 |
| FR | 2 908 827 | 5/2008 |

* cited by examiner

*Primary Examiner* — Dwayne J White
*Assistant Examiner* — Su Htay
(74) *Attorney, Agent, or Firm* — Oblon, McClelland, Maier & Neustadt, L.L.P.

(57) ABSTRACT

A fan for an aircraft turbine engine, including an intake cone including a balancing system including a plurality of mass accommodation holes and at least one balancing mass mounted in one of the holes. The balancing system further includes an attachment mechanism exerting pressure that flattens the balancing mass against the bottom of its mass accommodation hole, the accommodation hole being made blind in the intake cone, so as to open out inside the intake cone.

14 Claims, 6 Drawing Sheets

TURBINE ENGINE FAN COMPRISING A BALANCING SYSTEM WITH BLIND HOLES FOR ACCOMMODATING MASSES

TECHNICAL FIELD

The present invention generally relates to a fan of a turbine engine. More particularly, it relates to the balancing system with which the fan is equipped, allowing final balancing of the turbine engine.

The invention preferably applies to an aircraft jet turbine engine.

STATE OF THE PRIOR ART

From the prior art, it is actually known how to equip the fan of a jet turbine engine with an annular balancing flange bearing sensibly positioned masses, in order to achieve final balancing of the jet turbine engine.

With reference to FIGS. 1 and 2, a conventional embodiment known from the prior art is illustrated.

In these figures, a fan 1 with a longitudinal axis or axis of rotation 2, also corresponding to the longitudinal axis of the associated jet turbine engine, may therefore be seen. This fan comprises a fan disk 4 centered on the axis 2, fan blades 6 added onto the disk 4 and spaced apart from each other along a circumferential or tangential direction, schematized by the double arrow 8.

In this way, the blades 6 are driven into rotation with the disk 4, around the axis of rotation 2. It further comprises in a known way, sectors forming a platform (not shown) fixedly added onto the disk 4, between two directly consecutive blades 6 in the circumferential direction 8, these sectors partly defining an inter-blade surface intended to be followed by an annular airflow passing through the fan, also called a vein of the jet turbine engine. The direction of this flow or of this vein 22 globally corresponding to the main direction of flow of the gases within the jet turbine engine, is represented by the arrow 14, and may also be assimilated to an axial direction of the fan 1.

Moreover, the fan 1 is also equipped with an annular blade-retaining device 16, with which the blades 6 may be retained in the axial direction 14, upstream. In this respect, it is noted that in the whole of the description, the terms of <<upstream>> and <<downstream>> are to be considered according to the main direction of flow 14 of the gases within the jet turbine engine.

Upstream from the fan blades 6, the fan 1 has an intake cone 20 centered on the axis 2, and the substantially conical outer surface 19 of which is intended to be followed by the aforementioned vein 22. This cone 20, driven into rotation about the axis 2 with the fan disk 4, may be made in one or several adjacent portions, for example an upstream portion 20a stemming from the apex of the cone, and a downstream portion 20b adjacent to the fan blades, as this is visible in FIGS. 1 and 2.

The downstream portion 20b, also called a rear cowl shroud, may, in addition to its function of defining a portion of the outer surface 19 for delimiting the vein 22, also integrate an additional function of a system for balancing the jet turbine engine.

Indeed, this downstream portion 20b forms an annular balancing flange rotationally coupled with the fan disk 4 about the axis of rotation 2, equipped with a plurality of mass accommodation holes 24 spaced apart circumferentially from each other. As an indicative example, these are for example thirty-six through-holes 24 which are provided on the external radial end of the balancing flange 20b. As this is visible in FIGS. 1 and 2, in the embodiments of the prior art, the mass accommodation holes 24 therefore open out at their external radial end into the vein 22.

When operating, the holes 24 each accommodate a screw-shaped balancing mass 26, the dimensions of which are retained so that the associated masses allow optimum balancing of the jet turbine engine, compensating the residual unbalance. Thus, in a way known to one skilled in the art, it is the shaft length of the screws which is adapted according to the desired mass, these screws being accommodated in their associated holes with the screw head oriented radially outwards.

Nevertheless, if this configuration gives the possibility of obtaining optimum balancing of the jet turbine engine, it is not without having any drawback. Firstly, it is indicated that the crossing nature of the holes 24, implying that they open out into the vein 22, requires that each of these holes be obturated by a balancing screw 26, in order to avoid leaks of the vein towards the inside of the intake cone 20. Therefore, the large number of balancing screws 26 which results from the constraints, for example thirty-six, is a great penalty in terms of mass.

Moreover, even when the screws 26 are set into place, the outer surface 19 for defining the vein 22 does not have a perfect aerodynamic profile, given that recesses 28 subsist at the external radial end of the mass attachment holes, as this is clearly visible in FIGS. 1 and 2. These recesses 28, the bottoms of which are formed by the associated screw heads, essentially stem from the layout in the radial direction of the screws, combined with the substantially conical nature of the surface 19. With this aerodynamic profile adversely affected by the recesses 28, the airflow on the intake cone is clearly not optimized. The result of this is drag, and therefore performance losses of the jet turbine engine.

SUMMARY OF THE INVENTION

The object of the invention is therefore to at least partly find a remedy to the drawbacks mentioned above, relating to embodiments of the prior art.

To do this, the object of the invention is first of all a fan for an aircraft turbine engine, comprising a turbine engine intake cone having an outer surface intended to be followed by a vein of the turbine engine, a fan disk as well as fan blades mounted on said disk with which they rotate about an axis of rotation of the fan, said fan further comprising a balancing system rotationally coupled with the fan disk about said axis of rotation, said balancing system being equipped with a plurality of mass accommodation holes spaced apart circumferentially from each other, and also comprising at least one balancing mass mounted in one of said mass accommodation holes. According to the invention, said balancing system further includes attachment means exerting pressure flattening said balancing mass against the bottom of its mass accommodation hole, the latter being made blind in the intake cone so as to open out inside the latter.

The fan according to the invention is remarkable in that the balancing mass accommodation holes no longer open out in the vein of the turbine engine, from which they remain actually isolated by the intake cone itself. In other words, the aerodynamic outer surface of the cone is therefore exteriorly located radially relatively to the bottoms of the mass accommodation holes, the latter being therefore concealed relatively to the vein by this outer surface of the cone.

Thus, the fact that the mass accommodation holes are concealed by the intake cone, and no longer provided as through-holes in the latter, advantageously implies that the outer surface for defining the vein no longer has mass accommodation recesses as described earlier in connection with the embodiments of the prior art. The airflow on the intake cone is therefore optimized, which globally generates a reduction in drag, and therefore an increase in the performances of the turbine engine.

Further, providing blind mass accommodation holes which do not open into the vein implies that it is no longer necessary to accommodate a mass in each hole, unlike prior embodiments. Therefore, it is possible, even preferred, to end up with balancing providing the placement of masses only in certain of the holes provided for this purpose, thus advantageously leading to a substantial reduction in the mass of the balancing system, and of the fan integrating this system. Under certain conditions, the balancing may even be carried out with a single mass accommodated in one of the holes.

Preferably, it is provided that during operation, at least one of said mass attachment holes, and even more preferentially a plurality of these same holes, are left free.

Further, another originality of the present invention lies in how each balancing mass is retained in its associated hole. Indeed, it is flattened against the bottom of its blind hole, by pressure applied by attachment means provided for this purpose, and which may assume any shape deemed to be suitable by one skilled in the art. Preferentially, these attachment means are mounted on the intake cone.

In this respect, it is specified that said attachment means and the balancing mass with which they cooperate, form a balancing mass assembly. Each of the elements forming the assembly therefore has an influence on the overall mass of this assembly. Nevertheless, even if this may be otherwise, it is preferentially ensured that the mass of the attachment means is identical for all the mass assemblies of the balancing system, then implying that only the balancing masses have an influence on the overall mass of the assemblies.

Preferably, said attachment means comprise a part forming a nut and a pressure screw screwed into said part, said nut being retained at said cone in the direction of the pressure screw. In such a case, it is therefore the screw which will exert pressure on the balancing mass in order to flatten it against the bottom of its blind accommodation hole.

Preferably, said mass accommodation holes open out into the bottom of a groove centered on the axis of rotation, and said groove respectively has on either side of its bottom, two sidewalls formed so as to form means for retaining the nut in said groove.

Preferably, said groove opens radially inwards, but may alternatively open in the axial direction or in any other direction.

Preferably, said balancing mass has an end with the shape of a spherical portion, mating the shape of the bottom of the accommodation hole against which it is flattened. With this, it is possible to ensure good hold of the balancing mass, the other end of which then cooperates with the attachment means, i.e. preferentially the pressure screw. A mass end with the shape of a conical portion would also be possible, also provided for mating the shape of the bottom of the accommodation hole against which it is flattened.

Preferably, said cone is in aluminium or in one of its alloys. In such a case, it is noted that the pressure screws will not directly be in contact with the cone, but exert pressure via the associated balancing mass, which reduces the risks of deterioration of the cone.

Preferably, said intake cone is made from an upstream portion fixedly mounted on a downstream portion forming a shroud, and said balancing system is implanted on said downstream portion forming a shroud.

Preferably, said intake cone includes an annular attachment flange fixedly added onto said fan disk, even if it may be fixedly added on any other element of the rotating block of the fan, without departing from the scope of the invention.

Preferably, the fan further includes a ring for retaining the fan blades with which these blades may be retained axially relatively to said fan disk, said retention ring being rotationally coupled with said fan disk, and also preferably with said annular attachment flange of the cone.

Preferably, said intake cone extends downstream as far as said fan blades, in one or several parts. As mentioned above, it is possible to make the intake cone in an upstream portion stemming from the apex of the cone and a downstream portion adjacent to the fan blades, the benefit then lying in the possibility of independently optimizing these portions, for example depending on the levels of mechanical/thermal stresses which may be encountered by the latter.

Finally, the object of the invention is also an aircraft turbine engine comprising a fan as described above, said turbine engine being preferentially a jet turbine engine.

Other advantages and features of the invention will become apparent in the non-limiting detailed description below.

SHORT DESCRIPTION OF THE DRAWINGS

This description will be made with reference to the appended drawings wherein:

FIG. 1, already described, illustrates a longitudinal sectional view of a fan portion for a jet turbine engine according to a conventional embodiment known from the prior art;

FIG. 2, already described, illustrates a partial perspective view of the fan shown in FIG. 1;

DETAILED DESCRIPTION OF PREFERRED EMBODIMENTS

With reference to FIGS. 3 to 6, a portion of a fan 1 for an aircraft jet turbine engine may be seen, according to a preferred embodiment of the present invention. More specifically, this is the downstream portion 20b of the intake cone, also called a rear cowl shroud, which not only fulfils the function of defining a portion of the outer surface 19 for delimiting the vein 22, but is also intended to bear the balancing system of the jet turbine engine.

Figure 1:
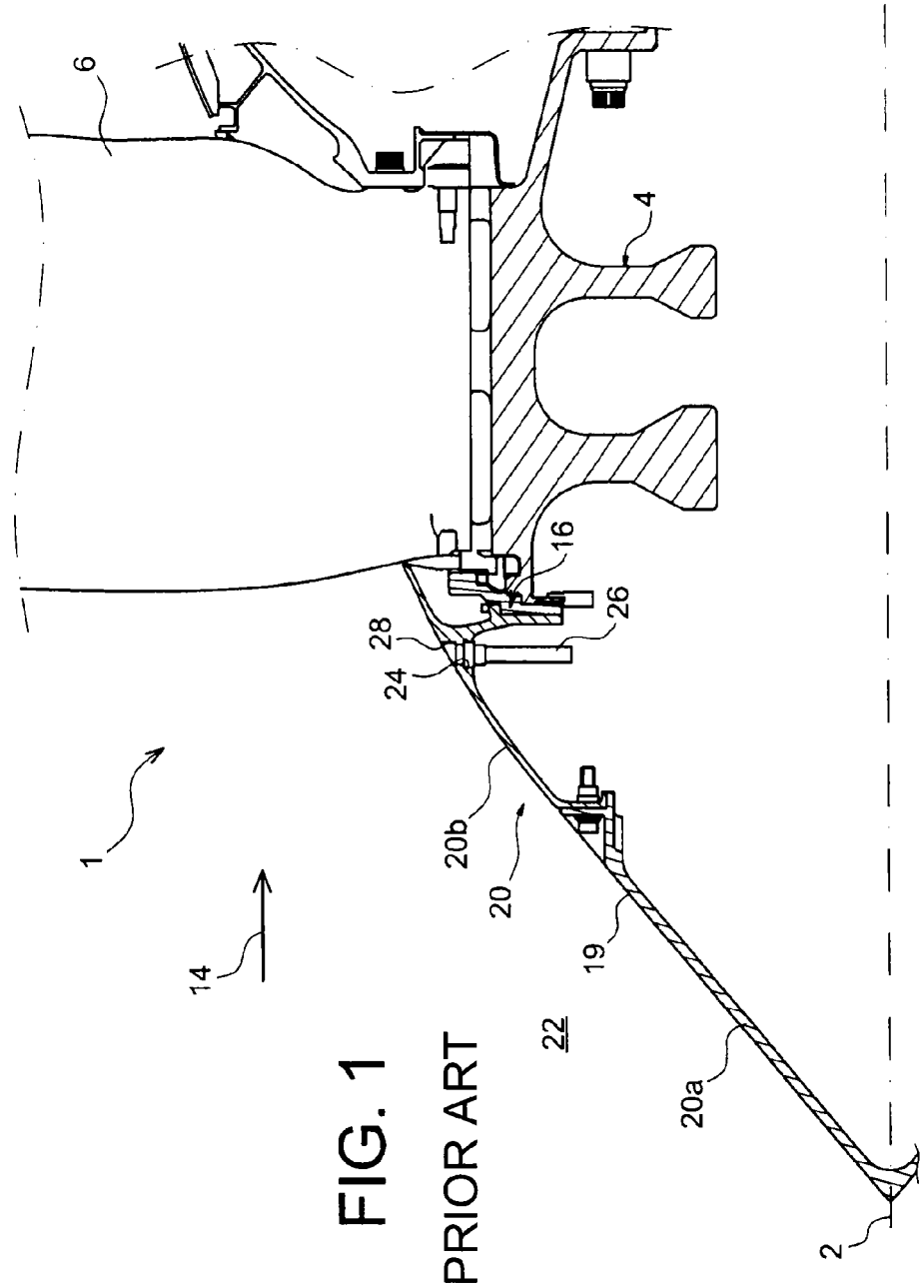
Figure 2:
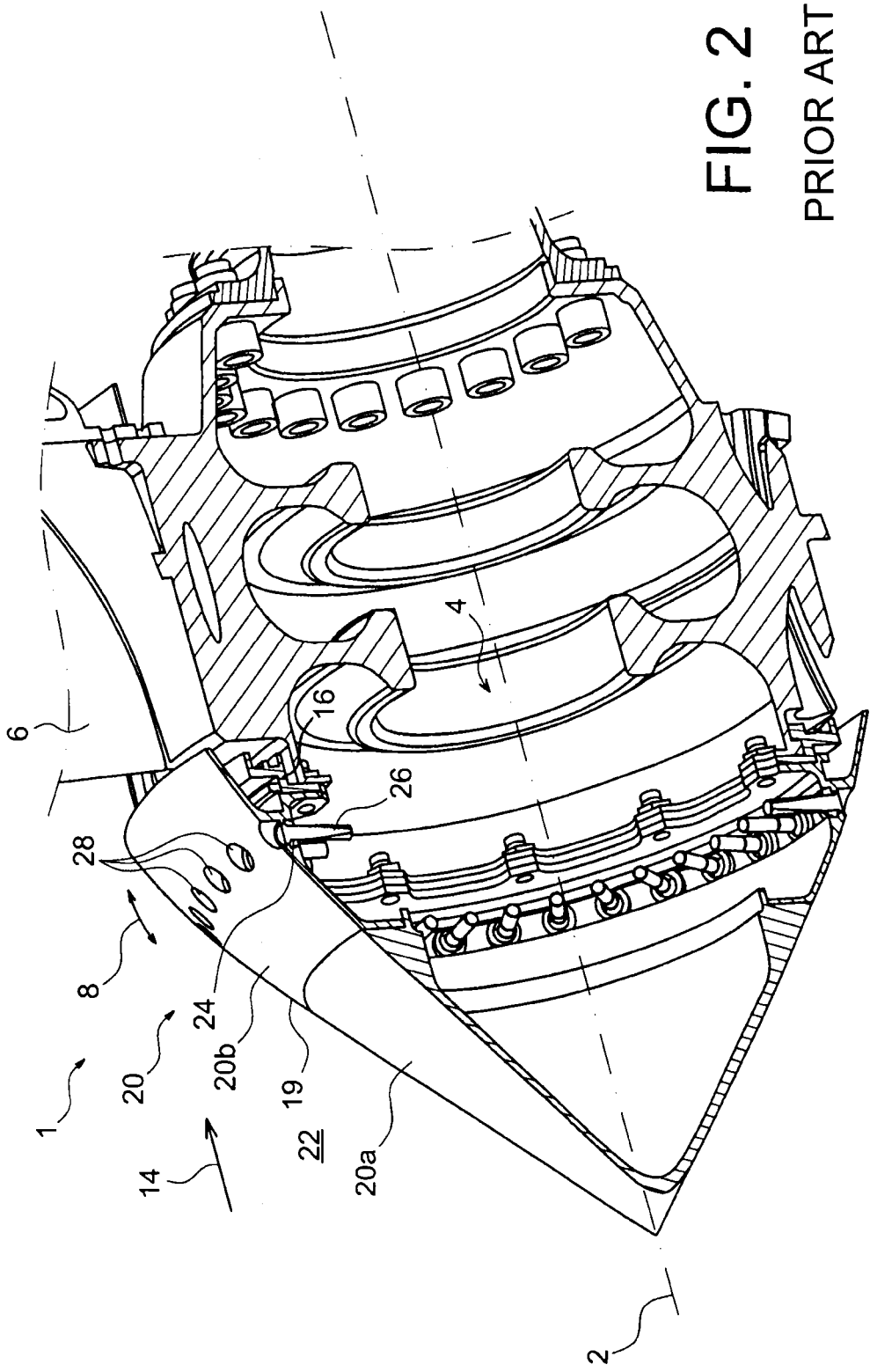

The other elements of the fan 1 have not been illustrated for some of them or only partly for other ones, but should be considered, for this preferred embodiment, as being identical with or similar to those described with reference to FIGS. 1 and 2 illustrating the prior art. Moreover, in these figures, the elements bearing the same numerical references correspond to identical or similar elements.

This rear cowl shroud 20b, preferably made in a single piece in aluminium or in one of its alloys, therefore comprises an upstream end intended to be attached on a downstream portion of the intake cone, while its downstream end is intended to be flush with the fan blades as far as which it extends. Further, as in the prior art described earlier, the shroud 20b has an annular attachment flange, referenced as 40 in the figures. This flange 40, extending radially inwards, is fixedly mounted on the fan disk 4, so as to be firmly secured with the latter in rotation, about the longitudinal axis 2. This is carried out in a standard way, for example with bolts passing through both flanges. In this respect, like in the prior art illustrated in FIGS. 1 and 2, both of these flanges may be laid out on either side of the ring 16 for retaining the fan blades, with which these blades may be retained axially relatively to the fan disk 4. Here, the ring 16 attached to the flange 40 of the cone and to the disk 4 making it interdependent in rotation with both of these elements, is therefore located inside the shroud 20b, which isolates it from the vein 22.

Thus, both of these elements 16, 34 may share the same attachment means 38 on the rotating fan block.

Figure 3:
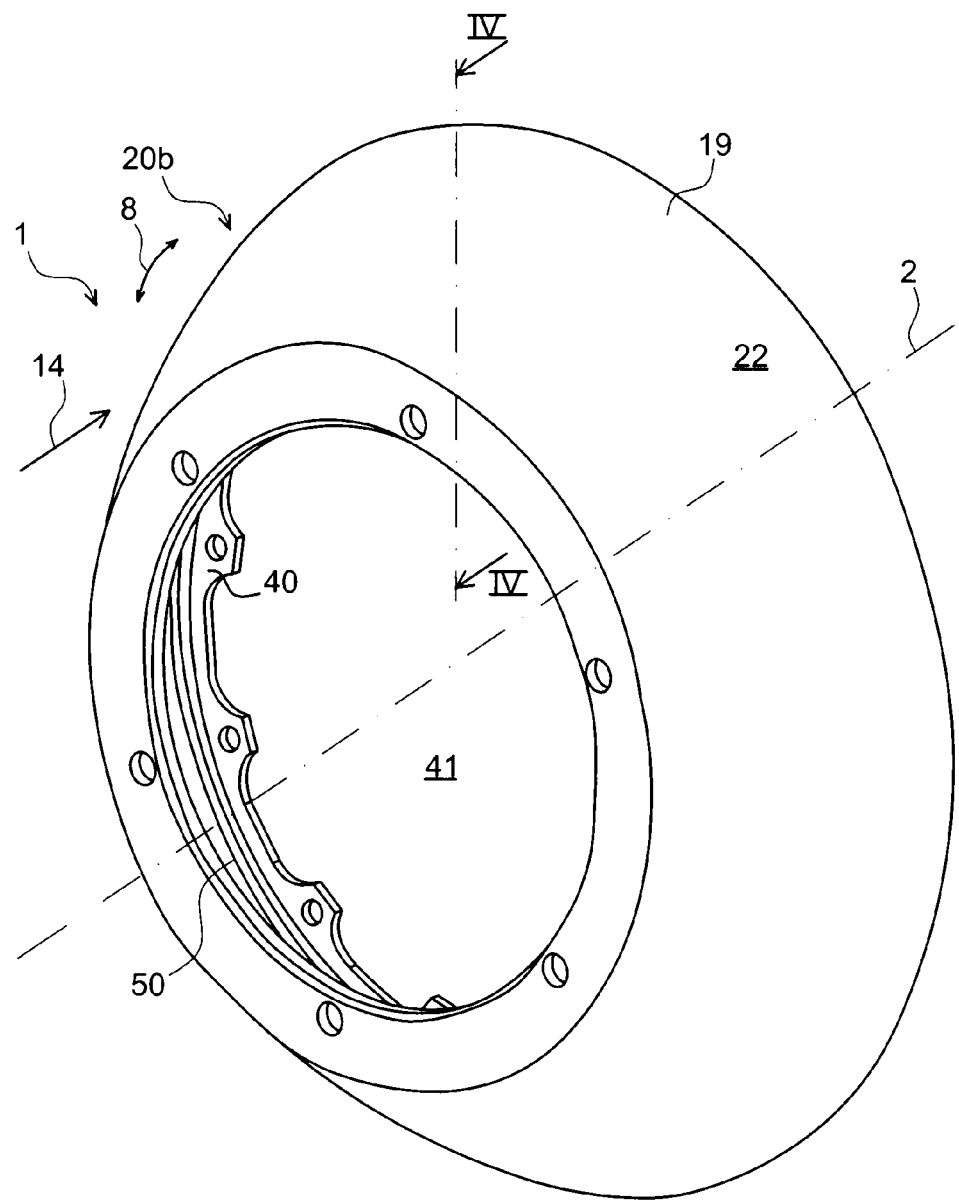
FIG. 3 illustrates a perspective view of the rear cowl shroud intended to equip a fan for a jet turbine engine, according to a preferred embodiment of the present invention.

As shown in FIG. 3, it is possible to ensure that the cone 20 also conceals the ring 16 for retaining the fan blades, this possibility may be adopted whether the ring 16 is made in a single piece with the flange 34, or not.

One of the particularities of the invention lies in the fact that the balancing system with which the fan is equipped, intended to ensure the final balancing of the jet turbine engine, is laid out inside the cone, and more specifically in an inner space 41 of its downstream portion 20b, so as to be concealed from the vein 22.

More specifically, the system has a plurality of mass accommodation holes 42, made in the shroud 20b, these holes 42 being blind and opening out into the inner space defined by this shroud, while being preferentially oriented along the radial direction of the fan.

This specific layout is retained so that the mass accommodation holes 42 are isolated from the vein 22 following the shroud 20b, i.e. they do not open out into the latter, or are further concealed from the latter.

In addition to the holes 42 spaced apart circumferentially from each other in the thickness of the shroud 20b, the balancing system also comprises at least one balancing mass assembly cooperating with one of the holes 42. One or several of these mass assemblies are therefore mounted on the rear cowl shroud 20b, respectively associated with accommodation holes 42, their number depending on the required balancing. One of the advantages of the present invention lies in the possibility, which is moreover preferentially retained, of establishing a final balancing of the jet turbine engine by leaving free one or several holes 42, in order to obtain a gain in mass. In such a case, the absence of obturation of the holes not accommodating any mass does not generate any leak problem at the vein 22, given that these holes remain isolated from the latter, in particular by the outer surface 19 radially shifted outwards.

Each mass assembly comprises a balancing mass 44 accommodated in the hole 42 associated with this assembly, as well as attachment means cooperating with the shroud and exerting pressure on the mass 42 in order to flatten it against the bottom of its hole 42.

In this preferred embodiment, the attachment means comprise a plate 46 forming a nut, as well as a pressure screw 48 screwed into the nut, preferably so as to be coaxial with the hole 42 in which the mass 44 is accommodated, on which it exerts pressure.

In order to maintain the plate 46 relatively to the shroud 20b, in the radial pressure direction, this shroud is equipped with a groove 50 centered on the axis 2, the accommodation holes 42 opening out into the bottom 52 of this groove. The latter opens radially inwards, its bottom 52 being therefore also oriented along this same direction. It is not only delimited by its bottom 52, but also by two sidewalls 54 positioned on either side of the latter. These walls 54 are formed so as to be means for retaining the plate 46, generating projections which shrink the opening of the groove, for example in the form of bulges 56.

Figure 6:
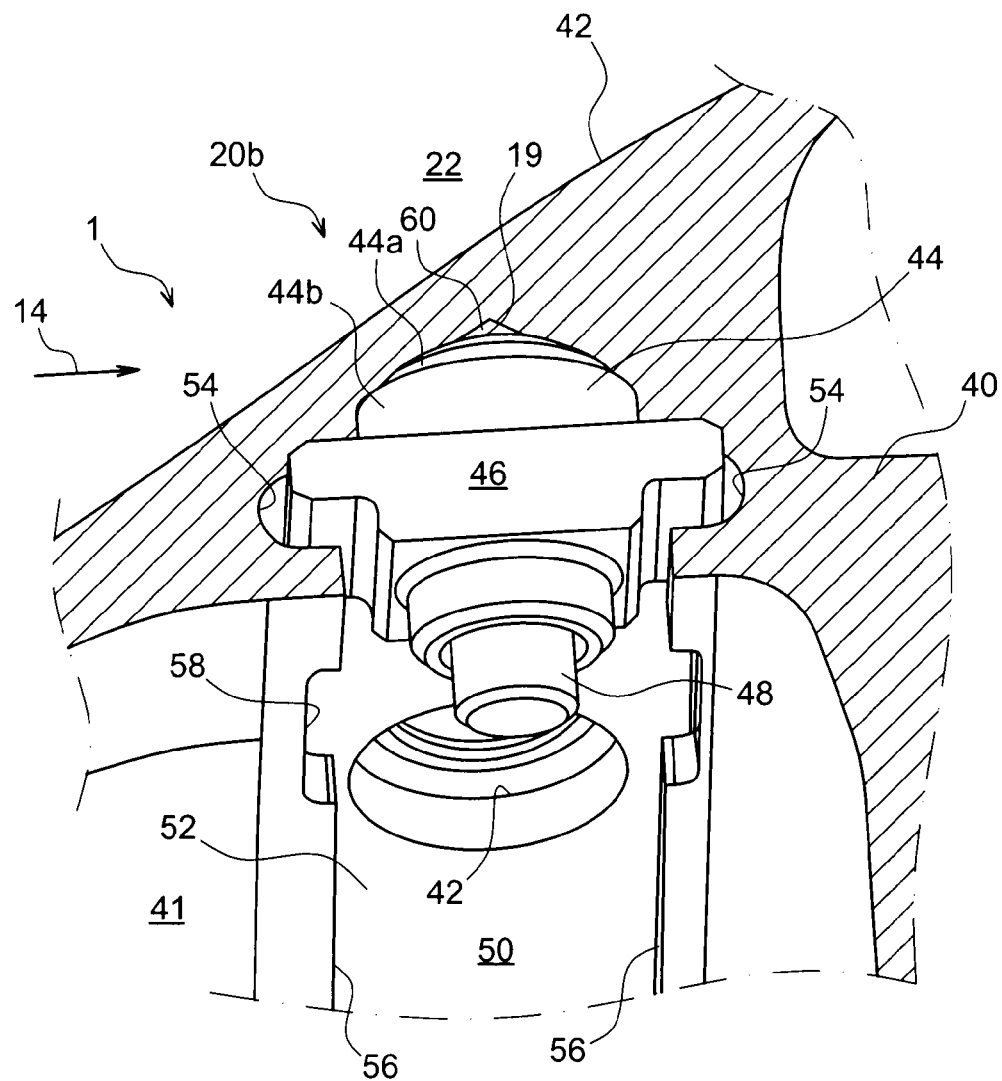
FIG. 6 is an enlarged partial view of the one shown in FIG. 5, essentially showing a balancing mass assembly cooperating with one of the holes for accommodating the balancing system with which the rear cowl shroud is equipped.

Thus, as shown in FIG. 6, each plate 46 may be inserted into the groove 50 at a notch 58 provided for this purpose in the sidewalls 54, preferably by a radial movement towards the outside of this plate. Next, it is moved circumferentially in the groove by sliding in the annular slot delimited between the bottom 52 and the retention bulges 56, this movement being stopped when the plate 46 is located facing its associated accommodation hole 42.

By tightening the screw 48 through the plate 46, it is possible to flatten the balancing mass installed beforehand against the bottom of the hole 42, with the external radial end of this screw exerting pressure on this mass, preferably by being in direct contact with the latter. By reaction, the plate 46 will itself be flattened against the retention bulges 56, guaranteeing the absence of loosening of the assembly during the operation of the jet turbine engine.

Figure 4:
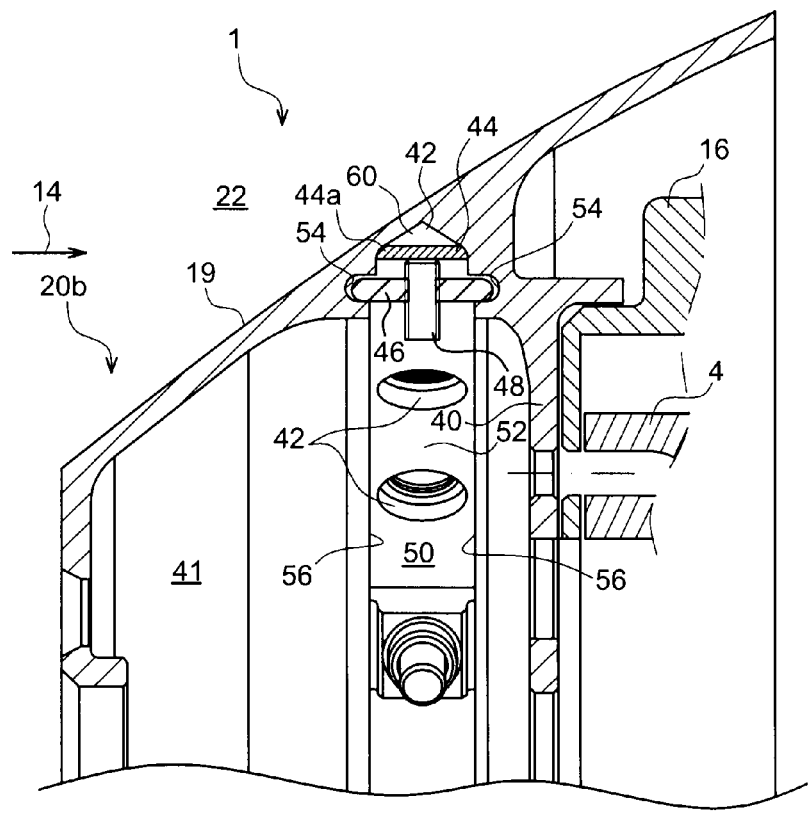
FIG. 4 illustrates a longitudinal sectional view of a portion of the rear cowl shroud shown in FIG. 3, taken along the line IV-IV.
Figure 5:
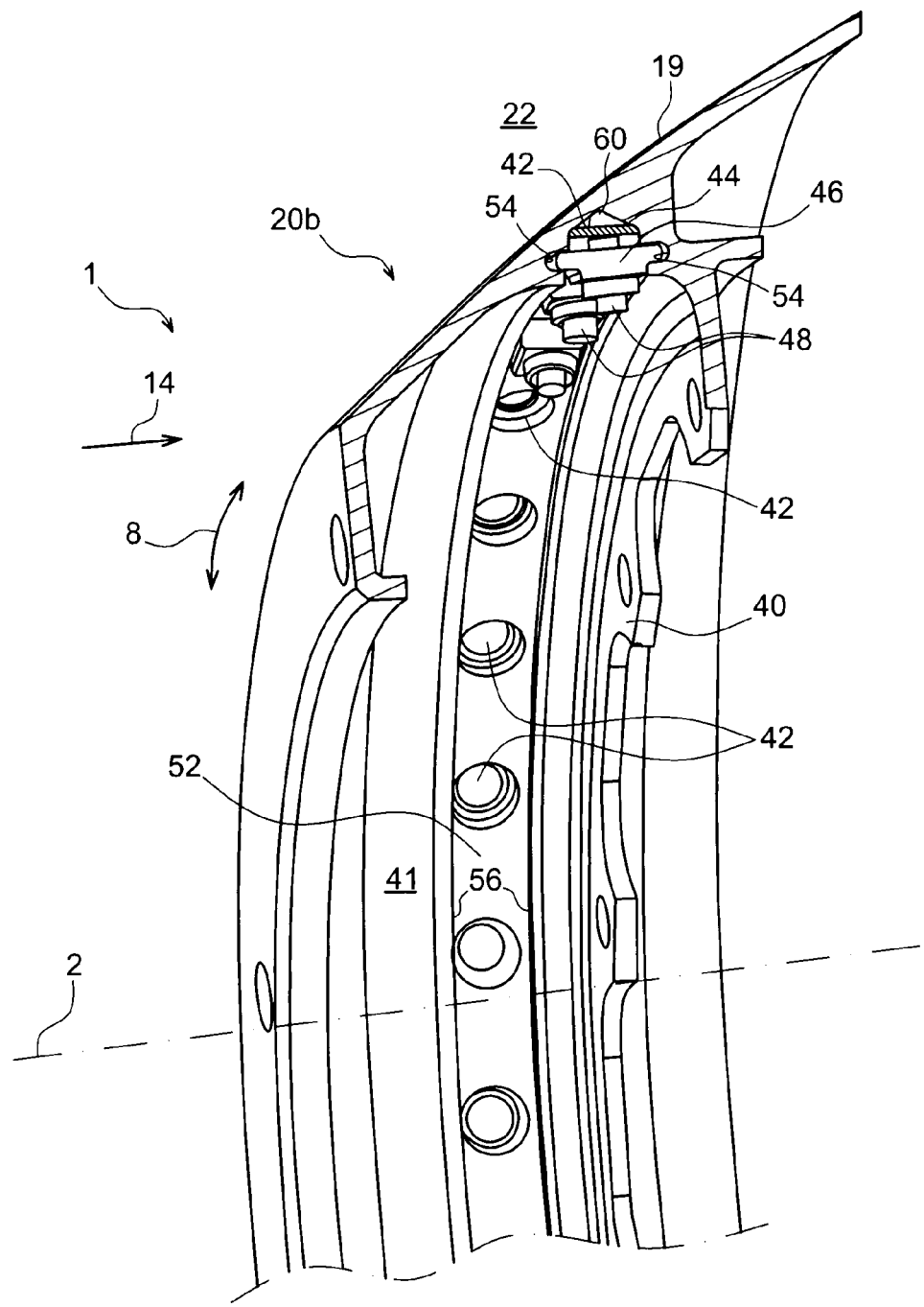
FIG. 5 is a perspective view showing a portion of the inside of the rear cowl shroud of FIG. 3.

As mentioned earlier, only certain holes 42 may be equipped with a balancing mass assembly, the other holes remaining free. Preferably, for all the mass assemblies used, the plates 46 and the screws 48 are of identical shape and mass, only the masses 44 therefore have an influence on the overall mass of the mass assemblies. As an indicative example, it may be seen that the mass 44 of the assembly shown in FIGS. 4 and 5 is smaller than the mass 44 of the assembly shown in FIG. 6.

Whatever the case, it is preferably ensured that the external radial end of each mass 44 appears as a spherical portion 44a, in contact with a mating shape intended for the bottom of the hole 42. In the preferred described embodiment, each hole actually comprises a bottom having a spherical portion with which the spherical portion 44a of the mass conforms, but not making up the entirety of this bottom. Actually, the bottom is equipped here with a dead space 60, for example of conical shape, forming the continuity of the spherical portion and not being filled by the mass 44 when the latter is flattened against the bottom of the hole 42.

The shape of each of balancing mass 44 is retained depending on the desired mass at the given location for optimized final balancing. Preferably, each mass 44 comprises at least the spherical portion 44a, as this is the case for the mass 44 illustrated in FIGS. 4 and 5, and may optionally be extended radially towards the inside by a cylindrical portion 44b, as this is the case for the mass 44 illustrated in FIG. 6. In this last configuration, the cylindrical portion 44b, preferably of circular section, at most extends as far as the opening of the hole, corresponding to the accommodation groove 50 of the plates 46.

Of course, various modifications to the invention which has just been described, may be made by one skilled in the art, only as non-limiting examples.

The invention claimed is:
1. A fan for an aircraft turbine engine, comprising:
   a turbine engine intake cone including an outer surface configured to be followed by a vein of the turbine engine;
   a fan disk and fan blades mounted on the disk with which the fan blades rotate about an axis of rotation of the fan;

a balancing system rotationally coupled with the fan disk about the axis of rotation, the balancing system including:
   a plurality of mass accommodation holes spaced apart circumferentially from each other,
   at least one balancing mass mounted in one of the accommodation holes, and
   attachment means exerting pressure flattening the balancing mass against the bottom of its mass accommodation hole, the accommodation hole being made blind in the intake cone, so as to open out inside the intake cone,
wherein the mass accommodation holes are formed in an inner surface of the intake cone such that the mass accommodation holes are concealed from the vein.

2. The fan according to claim 1, wherein the attachment means and the balancing mass cooperate to form a balancing mass assembly.

3. The fan according to claim 2, wherein the attachment means comprises a part forming a nut and a pressure screw screwed into the part, the nut being retained to the cone in the direction of the pressure screw.

4. A fan for an aircraft turbine engine, comprising:
a turbine engine intake cone including an outer surface configured to be followed by a vein of the turbine engine;
a fan disk and fan blades mounted on the disk with which the fan blades rotate about an axis of rotation of the fan;
a balancing system rotationally coupled with the fan disk about the axis of rotation, the balancing system including:
   a plurality of mass accommodation holes spaced apart circumferentially from each other,
   at least one balancing mass mounted in one of the accommodation holes, and
   attachment means exerting pressure flattening the balancing mass against the bottom of its mass accommodation hole, the accommodation hole being made blind in the intake cone, so as to open out inside the intake cone,
wherein the mass accommodation holes open out in a bottom of a groove centered on the axis of rotation, and the groove on either side of its bottom respectively includes two sidewalls formed so as to form the part of the attachment means retaining a nut in the groove.

5. The fan according to claim 4, wherein the groove opens radially inwards.

6. A fan for an aircraft turbine engine, comprising:
a turbine engine intake cone including an outer surface configured to be followed by a vein of the turbine engine;
a fan disk and fan blades mounted on the disk with which the fan blades rotate about an axis of rotation of the fan;
a balancing system rotationally coupled with the fan disk about the axis of rotation, the balancing system including:
   a plurality of mass accommodation holes spaced apart circumferentially from each other,
   at least one balancing mass mounted in one of the accommodation holes, and
   attachment means exerting pressure flattening the balancing mass against the bottom of its mass accommodation hole, the accommodation hole being made blind in the intake cone, so as to open out inside the intake cone,
wherein the balancing mass includes an end with a spherical portion shape, mating a shape of the bottom of the accommodation hole against which the balancing mass is flattened.

7. The fan according to claim 1, wherein the cone comprises aluminum.

8. The fan according to claim 1, wherein the intake cone is made from an upstream portion fixedly mounted on a downstream portion forming a shroud, and the balancing system is implanted on the downstream portion forming the shroud.

9. The fan according to claim 1, wherein during operation, at least one of the mass accommodation holes is left free.

10. The fan according to claim 1, wherein the intake cone includes an annular attachment flange fixedly added onto the fan disk.

11. The fan according to claim 1, further comprising a ring for retaining the fan blades with which the fan blades may be retained axially relatively to the fan disk, the retaining ring being rotationally coupled with the fan disk.

12. The fan according to claim 1, wherein the intake cone extends downstream as far as the fan blades.

13. A turbine engine for an aircraft comprising a fan according to claim 1.

14. The turbine engine for an aircraft according to claim 13, which is a jet turbine engine.

* * * * *